July 7, 1964 — D. J. BORODIN — 3,139,802
VELOCITY CONTROL MECHANISM
Filed Dec. 20, 1962 — 2 Sheets-Sheet 1

INVENTOR.
DANIEL J. BORODIN
BY
ATTORNEYS

July 7, 1964
D. J. BORODIN
3,139,802
VELOCITY CONTROL MECHANISM
Filed Dec. 20, 1962
2 Sheets-Sheet 2
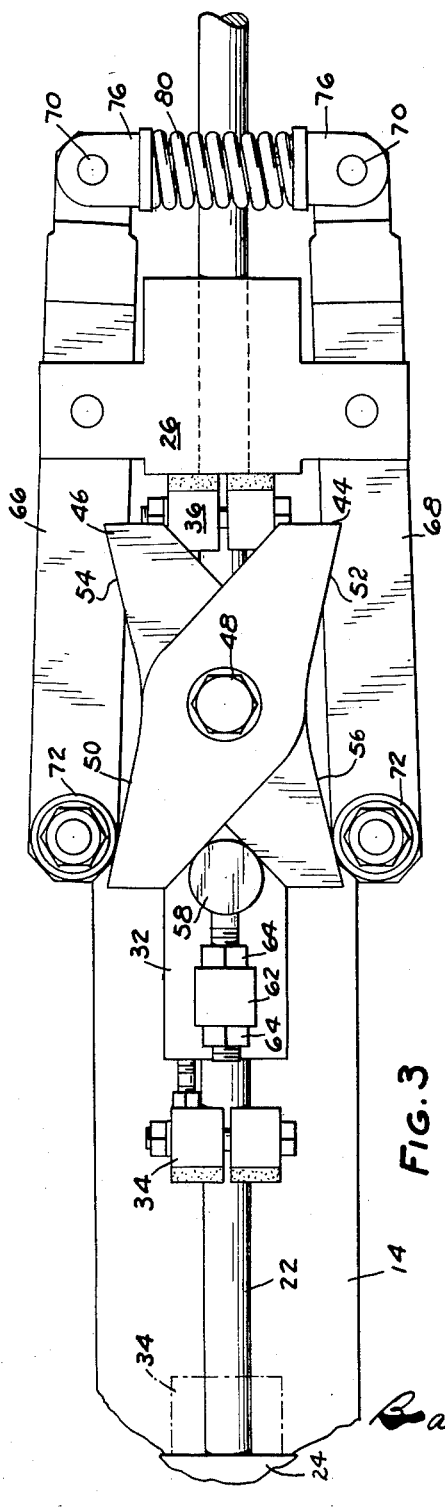
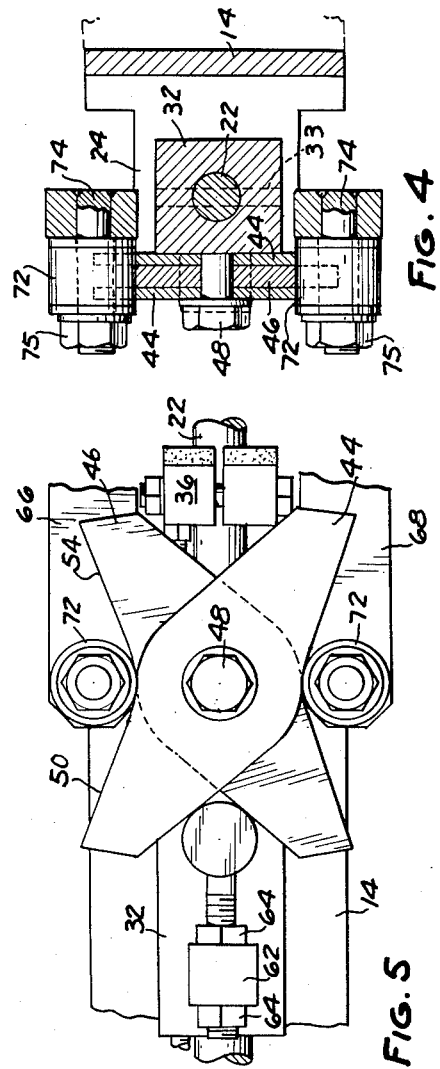
INVENTOR.
DANIEL J. BORODIN
BY
Barnes, Kisselle, Raisch
& Choate
ATTORNEYS United States Patent Office 3,139,802
Patented July 7, 1964

3,139,802
VELOCITY CONTROL MECHANISM
Daniel J. Borodin, Detroit, Mich., assignor to U.S. Automation Company, Detroit, Mich., a corporation of Michigan
Filed Dec. 20, 1962, Ser. No. 246,117
20 Claims. (Cl. 92—13)

This invention relates to a velocity control mechanism and more particularly to an arrangement for controlling the velocity of a reciprocating member such as a shuttle, slide or like member.

In many reciprocating mechanisms, for example, transfer devices employing shuttle bars, it is desirable to reciprocate an element through a stroke of accurate length in a minimum time interval. Pneumatic or hydraulic cylinders are frequency used to supply the power for reciprocation and stops engaged by the reciprocating element are frequently employed for controlling the length of the stroke of the reciprocating element. In order to obtain high speed cycling of the reciprocating mechanism with an arrangement of this type, it is desirable to decelerate the reciprocating element as it approaches the opposite ends of its stroke. Otherwise, an undesirably high impact force between the reciprocating element and the stops will result. At the same time, it is desirable to rapidly accelerate the reciprocating element at the beginning of its stroke in order to obtain high speed operation.

It is an object of this invention to provide a novel velocity controlling device which is simple in construction and reliable in operation.

A further object of the invention resides in the provision of a velocity control device for a reciprocating mechanism which is entirely mechanical in its operation as distinguished from hydraulic, pneumatic, electrical or combinations thereof.

A still further object of the invention resides in the provision of a velocity control mechanism capable of extremely rapid cycling and which at the same time eliminates undesirable impact forces between the reciprocating element and stops which define the stroke thereof.

In the drawings:

FIG. 3 is a view similar to FIG. 2 and showing the parts of the reciprocating device in the position they assume when the reciprocating mechanism is adjacent one end of its stroke.

FIG. 4 is a sectional view along the line 4—4 in FIG. 2.

FIG. 5 is a fragmentary view similar to FIG. 2 and showing the manner in which the velocity control device may be adjusted to accommodate for different operating conditions.

Figures 1, 2, 6:
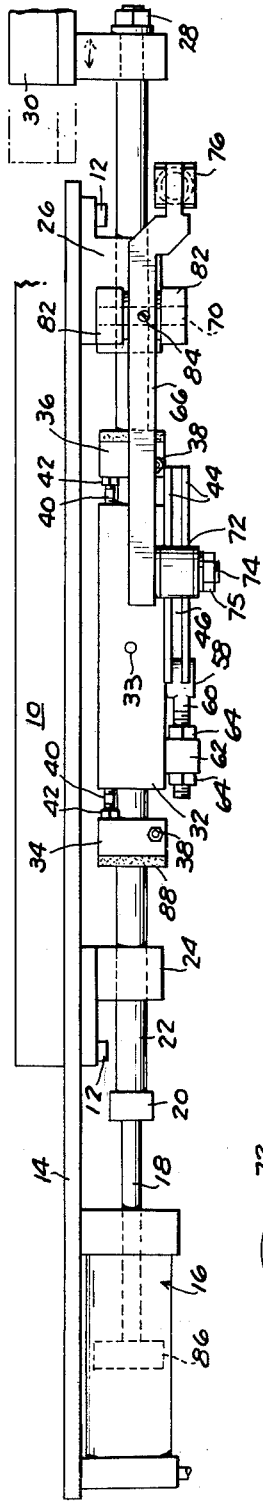
FIG. 1 is a fragmentary view of a reciprocating mechanism incorporating the velocity control device of the present invention.
FIG. 2 is a bottom plan view of the velocity control device illustrated in FIG. 1, the parts being shown in the positions they occupy when reciprocating element is at the mid-portion of its stroke.
FIG. 6 is a diagrammatic view illustrating some of the force vectors involved in the device.

Referring to FIG. 1, there is illustrated a reciprocating mechanism such as might be employed on a transfer device, machine tool, etc. The mechanism includes a stationary support 10 on which is secured as by screws 12 a mounting plate 14. On the underside of plate 14, there is fixedly supported a pneumatic cylinder 16, the piston rod 18 of which projects axially from one end of the cylinder. Rod 18 is connected by a coupling 20 to a shaft 22. Shaft 22 is guided for reciprocation by a pair of bearing blocks 24, 26. At its free end, there is secured to shaft 22 as by a nut 28 threaded on the end of the shaft a reciprocating member 30 which may be considered as a slide, shuttle bar, etc.

The velocity controlling device of the present invention includes a support block 32 mounted on shaft 22 and through which the shaft 22 extends. Block 32 is fixed axially of shaft 22 by one or more taper pins 33 which extend through the block and shaft 22. Adjacent the opposite ends of block 32, there is fixed on shaft 22 stop bushings 34, 36. These stop bushings are split radially at one side and frictionally clamped to shaft 22 by clamping screws 38. In order to maintain stop bushings 34, 36 in accurate axially fixed positions on shaft 22, there is provided at each end of block 32 a stud 40 which threads into the block at one end and which porjects at its opposite end into an unthreaded socket 41 in the adjacent stop bushing. An adjusting nut 42 on each stud abuts against the stop bushing. Nut 42 can be fixedly retained on stud 40 as by welding at 43 or, if it is desired to retain nut 42 in adjustably fixed position on stud 40, a jam nut (not shown) can be employed.

On the bottom side of block 32, there is mounted cam plates 44, 46 as by a screw 48. Cam plates 44 are two in number, identical in shape and positioned on opposite sides of the interposed cam plate 46. Cam plates 44, 46 are mounted on block 32 in scissors-like fashion and each cam plate is provided with diagonally opposite cam edges. The cam edges on plates 44 are designated 50, 52 while the cam edges on plate 46 are designated 54, 56. As is illustrated in the drawings, the cam edges 50, 52, 54, 56 all slope inwardly toward the screw 48 from the opposite ends of the cam plates. The inclination of the above referred to cam edges can be adjusted as desired by a cylindrical block 58 fixed on the end of a threaded stud 60 which extends through a bushing 62 fixed on body 32. A pair of adjusting nuts 64 threaded on stud 60 enables the stud together with the cylindrical block 58 to be adjusted toward and away from screw 48 to thereby vary the spread of the cam plates 44, 46 and accordingly vary the inclination of the cam edges 50, 52, 54, 56.

Bearing block 26 has a pair of links 66, 68 pivotally supported thereon as by pins 70 intermediate the ends of the links. Each link 66, 68 has a cam follower in the form of a cylindrical roller 72 journalled at one end thereof as by a pin 74. Rollers 72 are retained on pins 74 by nuts 75. Rollers 72 are arranged to engage the cam edges of cam plates 44, 46. The opposite ends of links 66, 68, that is, the ends of the shorter lever arms of these links, have spring retainers 76 pivoted thereon as at 78 and a compression spring 80 is arranged between the two retainers 76 so as to urge the cam rollers 72 inwardly toward each other and into engagement with the cam edges of cam plates 44, 46. Each bearing retainer 76 has its pivotally supported end in the form of a clevis between the legs of which the ends of links 66, 68 are pivotally secured. Likewise, bearing block 26 at each side thereof is fashioned with laterally extending, spaced apart legs 82, each pair of which form a clevis between which the arms 66, 68 are pivotally supported as by the pins 70. Each pin 70 is retained in position by a set screw 84.

In operation, it will be observed that cam plates 44, 46 shift axially with shaft 22 while the links 66, 68 are fixed axially relative to the mounting plate 14 and pivot in a horizontal plane about the pins 70. In FIG. 2, the parts are illustrated in the positions they assume when the reciprocating slide or shuttle bar 30 is at the mid point of its stroke. In this position, it will be observed that the cam rollers 72 engage the lowermost or innermost portion of their respective cam tracks, one cam track being defined by the cam edges 50, 54 and the other cam track being defined by the cam edges 52, 56. In this position of the parts, the piston 86 within the pneumatic cylinder 16 assumes a generally mid-point position within its cylinder. If at this time piston 86 is moving in a direction toward the left as viewed in FIGS. 1 and 2, shaft 22, block 32 and the cam plates 44, 46 will likewise shift in a direction toward the left. In so doing, the cam rollers 72 ride up the cam edges 50, 56 until further movement of the reciprocating assembly in a direction toward the left is arrested by the interengagement of stop bushing 34 with bearing block 24. Each stop bushing 34, 36 is provided at the face thereof which engages its respective bearing block 24, 26 with a bumper pad 88 formed of fiber or hard rubber. As the rollers 72 ride up the cam edges 50, 56, it will be noted that the pivotal movement of links 66, 68 compresses spring 80. Thus, spring 80 tends to resist pivotal movement of links 66 in a clockwise direction and link 68 in a counterclockwise direction as viewed in FIG. 2. Assuming that the spring 80 is a relatively stiff one, then it will be appreciated that the spring can be utilized for effectively opposing the force of the pneumatic cylinder 16 as the slide or shuttle bar 30 approaches the opposite ends of its stroke. As a practical matter, spring 80 is selected such that, in combination with the slope or inclination of the cam edges 50, 52, 54, 56, it substantially completely absorbs the kinetic energy of the reciprocating mass as the slide or shuttle bar 30 approaches the end of its stroke.

The device of this invention is designed and in operation adjusted such that the velocity of the side or shuttle bar 30 approaches zero as the stops 34, 36 come into engagement with their respective bearing supports 24, 26. Thus, the final force exerted by the spring through the linkage arrangement should have a horizontal component just slightly less than the force applied to the slide or shuttle bar 30 by the piston-cylinder assembly. Referring to FIG. 6 the force applied by the spring 80 to each roller through the respective links is designated $F_s$. The reaction force of the spring acting through the center of the roller and its point of tangency with its respective cam surface is designated $F_r$. Thus, the horizontal component of the spring force resisting movement of the shuttle or slide adjacent the end of its stroke may be designated $F_h$. The final resisting force of the spring can be represented by the following equation $$F_h = K_s \times D_s \times \tan\theta$$

where:

$K_s$ = the spring rate
$D_s$ = the displacement of the spring
$\theta$ = the inclination of the cam surface to the horizontal at the point of tangency corresponding to the end of the stroke.

From the above, it is apparent that the final resisting force of the spring depends upon a constant corresponding to the spring rate, the total deflection of the spring and the slope of the cam at the contact point corresponding to the end of the stroke. This, of course, assumes a fixed linkage ratio.

In addition to designing and adjusting the device so that final resisting force of the spring is just slightly less than the force of the piston-cylinder assembly, it is also necessary as a practical matter to design and adjust the device such that the total energy stored in the spring at the end of the stroke is about equal to the kinetic energy generated by the moving mass of the shuttle or slide at the point of maximum velocity. In the arrangement shown, the reciprocating mass has its maximum velocity when the two rollers 72 lie at the mid-point of the cams. In this connection, the cam surfaces 50, 54 and the cam surfaces 52, 56 blend in a smooth curve so that the action will be smooth and not abrupt. The energy stored in the spring is equal to the product of the mean force generated by the spring and the total deflection of the spring.

The above indicates the controlling features in the design and the adjustment of the velocity controlling device of this invention. The speed of reciprocation, that is, the duration of the cycle, depends primarily on the pressure on the cylinder. If the pressure on the cylinder is increased, the cycle is shortened. However, unless the increased pressure on the cylinder is compensated for in some manner, the terminal velocity of the shuttle will be increased. Thus, to reduce the terminal velocity to substantially zero when the cylinder pressure is increased, it is desirable to increase the inclination of the cam surfaces; that is, cylinder block 58 is advanced toward screw 48. This increases the final resisting force of the spring by increasing the slope of the cam surface at the end point of the stroke and also increases the total deflection of the spring. In FIG. 5, cam plates 44, 46 are shown adjusted so that the cam edges 50, 52, 54, 56 assume a greater inclination to the axis of shaft 22 than in the arrangement shown in FIGS. 2 and 3. With this adjustment, if the pressure on the cylinder is increased to compensate for this greater inclination and at the same time produce a substantial zero velocity of the shuttle at the end of its stroke, the shuttle will reciprocate at a more rapid rate.

It will be realized that although the reciprocating mass may have a velocity approaching zero as it reaches the end of its stroke, for example, when it reaches the position shown in FIG. 3 where the stop bushing 36 engages against the bearing block 26, when the slide or shuttle starts moving in the opposite direction, toward the left as viewed in FIG. 3, rollers 72 start rolling down the inclined cam edges 52, 54. Spring 80 expands, thus supplementing the force of cylinder 16 (a reversing valve now applying pressure to the opposite end) in moving the slide or shuttle in a direction to the left. The moving mass accelerates until the rollers 72 traverse the low points of their respective cams at which point the mass has its greater kinetic energy. Then, as the cam plates continue moving to the left, the spring 80 starts to deflect and the mass decelerates as the rollers 72 travel outwardly along the inclined cam edges 50, 56. The net result is that in the initial portion of the stroke of the shuttle or slide, the free floating spring 80 assists the action of the pneumatic cylinder 16 in moving the mass and thereby imparts a high velocity to the mass. As the reciprocating mass approachs either end of its stroke, the spring 80 opposes cylinder 16 with such force that the velocity of the reciprocating mass is reduced to practically zero and there is no substantial impact between the reciprocating mass and the fixed stops which limit its stroke.

Several advantages of the above arrangement are obvious. They include the ability to obtain a high velocity without impact, that is, quick cycling, the ability to vary the acceleration and deceleration by the shape of the cams and the terminal velocity of the reciprocating mass by the relative inclination of the cam plates 44, 46 and the pressure on the cylinder and also the provision of a velocity control device which is purely mechanical in its operation and eliminates the maintenance required in the operation of hydraulically actuated velocity control mechanisms.

Another advantage of the velocity control device of the present invention is that it is admirably suited for use with pneumatically operated transfer or shuttle devices. Such devices in many instances operate erratically but are desirable from the standpoint of cost. Thus, the velocity control device of this invention makes it practical to use such pneumatically operated mechanisms where they might otherwise be impractical.

I claim:

1. In a reciprocating mechanism of the type including a support, a fluid motor on said support and a movable element connected with said motor for reciprocation thereby, means for controlling the velocity of the movable element in at least one direction comprising cam and cam follower members associated one with the support and the other with the movable element, said cam member having an inclined rise portion adapted to be traversed by the follower member in response to movement of the movable element toward the end of its stroke in said one direction, resilient means acting on said follower member and tending to resist movement of the follower member over said rise portion of the cam and thereby opposing the driving force applied by said motor to said movable element in said one direction of reciprocation, said resilient means being sufficiently powerful to reduce the velocity of the movable element substantially as the movable element approaches the end of its stroke in said one direction.

2. In a reciprocating mechanism of the type including a support, a fluid motor on said support and a movable element connected with said motor for reciprocation thereby, means for controlling the velocity of the movable element in at least on direction comprising cam and cam follower members associated one with the support and the other with the movable element, said cam member having an inclined rise portion adapted to be traversed by the follower member in response to movement of the movable element toward the end of its stroke in said one direction, spring means acting on the follower member and tending to resist movement of the follower member upwardly over said rise portion of the cam member and thereby opposing the driving force applied by said motor to said movable element in said one direction of reciprocation, said spring means being of sufficient strength to oppose and to overcome to a substantial extent the energy of the moving mass of the movable element as it approaches the end of its stroke in said one direction.

3. The combination called for in claim 2 wherein said motor comprises a pneumatic piston-cylinder assembly.

4. The combination called for in claim 2 wherein said cam means are adjustable to vary the inclination of said rise portion.

5. The combination called for in claim 2 wherein the spring means are of sufficient strength to reduce the velocity of the movable element to a value approaching zero as the movable element approaches said end of its stroke.

6. The combination called for in claim 2 including a pivoted link, said cam follower member being carried by on end of the link and said spring means being connected with the other end of the link, said link being arranged to reduce the deflection of the spring relative to the displacement of the cam follower member.

7. In a reciprocating mechanism of the type including a support, a fluid motor on said support and a movable element connected with the motor for reciprocation thereby, means for controlling the velocity of the movable element as it approaches the opposite ends of its stroke comprising cam and cam following members, one of which is associated with the support and the other with the movable element, said cam member having two spaced, inclined rise portions thereon adapted to be traversed by the cam follower member in response to movement of the movable element towards the opposite ends of its stroke, spring means acting on said cam follower member and tending to resist movement of the cam follower member up said inclined rise portions and thereby opposing the driving force of the motor on the movable element as it approaches the opposite ends of its stroke, said spring means being of sufficient strength to oppose and overcome to a substantial extent the energy of the reciprocating mass of the movable element as it approaches the opposite ends of its stroke.

8. The combination called for in claim 7 wherein said motor comprises a pneumatic piston-cylinder assembly.

9. The combination called for in claim 8 including stop means on said support against which the movable element is adapted to abut to limit its stroke in opposite directions.

10. The combination called for in claim 9 wherein said spring means is of sufficient strength to reduce the velocity of the movable element to a value approaching zero as the movable element comes into engagement with said stop means.

11. The combination called for in claim 9 wherein said stop means are adjustable to vary the length of the stroke of the movable element and the cam member is adjustable to vary the inclination of the rise portions thereof.

12. In a reciprocating mechanism of the type including a support, a pneumatic piston-cylinder assembly on said support and a movable element connected with the piston-cylinder assembly for reciprocation thereby, means for controlling the velocity of the movable element comprising a pair of cam members and a pair of cam follower members, one pair of said members being mounted on the support and the other pair being movable with said movable element, a pair of links each pivotally supported between its ends for rotation about parallel axes, said follower members being carried by one set of corresponding ends of said links, spring means acting between the other ends of said links and biasing the cam follower members into engagement with their respective cams, each cam follower member being adapted to traverse its respective cam in response to reciprocation of the movable element, each cam having a pair of inclined rise portions thereon up which the cam followers are caused to ride as the movable element approaches the opposite ends of its stroke, said spring means acting through said links and tending to resist movement of the cam followers up said inclined rise portions to an extent sufficient to substantially reduce the velocity of the movable element as it approaches the opposite ends of its stroke.

13. The combination called for in claim 12 wherein the cams are mounted on the movable element and the links are pivotally supported on said support.

14. The combination called for in claim 12 including stop means on said support against which the movable element is adapted to abut to limit its stroke in opposite directions and wherein said spring means, said links and said cam members are adapted to resist movement of the movable element sufficiently to reduce its velocity to a value approaching zero as the movable element comes into abutting engagement with said stop means at the opposite ends of its stroke.

15. In combination, a support, a pneumatic piston-cylinder assembly on said support, a shuttle member connected with the rod of the piston for reciprocation thereby, means movable with said shuttle member and supporting a cam member having two opposed cam surfaces, a pair of links pivoted on said support between their ends, a pair of cam followers carried by a set of corresponding ends of said links and engaging one with each of said cam surfaces, a compression spring acting between the opposite end of said links and urging the cam followers into engagement with said cam surfaces, each of said cam followers being adapted to traverse its respective cam surface in response to reciprocation of said shuttle member, said cam surfaces each having a pair of inclined rise portions thereon spaced to correspond with the opposite end portions of the stroke of said shuttle member, said spring tending to oppose movement of each cam follower up said inclined rise portions of the cam surfaces and being of sufficient strength to decelerate the shuttle member substantially as it comes into engagement with said stop means to thereby reduce the impact force of the shuttle member against said stop means.

16. The combination called for in claim 15 wherein said cam member comprises a pair of cam plates pivotally supported on said cam carrying means and adjustable to vary the inclination of said rise portions of the cam surfaces to thereby vary the effective resistance of said spring.

17. The combination called for in claim 15 wherein said cam member comprises a pair of similarly shaped cam plates pivotally supported between their ends on said cam carrying means in angularly related, scissors-like fashion such that each of said cam surfaces is comprised of an edge portion of each of said cam plates and means on said cam carrying means engaged between corresponding end portions of said two cam plates and adjustable toward and away from the pivotal connection between the plates to vary the inclination of the rise portions of said cam surfaces.

18. In combination, a support, a pneumatic piston-cylinder assembly mounted on said support, a shuttle member adapted for linear reciprocation relative to said support, a shaft interconnecting said shuttle member and said piston-cylinder assembly for reciprocation thereby, a support block fixed to said shaft and carrying a cam member, said cam member having a pair of opposed cam surfaces, each cam surface having a pair of inclined rise portions thereon, said rise portions being spaced apart in a direction axially of said shaft, a pair of links mounted on said support for pivotal movement about axes extending transversely of the axis of said shaft, cam follower members carried by said links adjacent one end thereof and adapted to traverse said cam surfaces in response to reciprocation of said shuttle member, a compression spring acting between the opposite ends of said links, said spring tending to oppose movement of said cam followers up said inclined rise portions of the cam surfaces to thereby oppose reciprocation of said shuttle as the shuttle approaches the opposite ends of its stroke and to assist said piston-cylinder assembly in driving said shuttle during the initial portion of its stroke, said spring being of sufficient strength to substantially reduce the velocity of said shuttle member as it approaches the opposite ends of its stroke.

19. The combination called for in claim 18 wherein said cam member comprises a pair of cam plates having opposite edge portions defining cam edges, said cam plates being pivotally supported on said support block in crossed relation such that one cam edge of each plate cooperates with a cam edge of the other plate to define said pair of cam surfaces and means engaged between a pair of angularly related edges of said cam plates for varying the relative inclination of said cam edges.

20. The combination called for in claim 18 including a pair of stop members on said shaft spaced axially from the opposite ends of said support block adapted to abut against fixed abutments on said support for limiting the stroke of said shuttle member in opposite directions and threaded adjusting means extending between and interconnecting said support block and said stop members for adjustably fixing the position of said stop member on said shaft relative to said support block.

No references cited.